US011941072B1

(12) United States Patent
Margolin et al.

(10) Patent No.: US 11,941,072 B1
(45) Date of Patent: Mar. 26, 2024

(54) GENERATING A PROACTIVE ALERT FOR OUTDATED SCRAPING SCRIPT

(71) Applicant: INTUIT INC., Mountain View, CA (US)

(72) Inventors: Itay Margolin, Tel Aviv (IL); Aleksandr Kim, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/344,799

(22) Filed: Jun. 29, 2023

(51) Int. Cl.
*G06F 16/951* (2019.01)

(52) U.S. Cl.
CPC .................. *G06F 16/951* (2019.01)

(58) Field of Classification Search
CPC ..................................... G06F 16/951
USPC ......................................... 707/706
See application file for complete search history.

(56) References Cited

U.S. PATENT DOCUMENTS

| | | | | |
|---|---|---|---|---|
| 9,614,899 B1* | 4/2017 | Rukonic | ................ | H04L 67/34 |
| 10,990,940 B1* | 4/2021 | Asthana | ................ | H04L 67/02 |
| 2014/0149842 A1* | 5/2014 | Murthy | ................ | G06F 40/14 |
| | | | | 715/234 |
| 2015/0310562 A1* | 10/2015 | Chourasia | .............. | G06Q 40/00 |
| | | | | 705/30 |
| 2017/0220681 A1* | 8/2017 | Daas | ..................... | G06F 40/186 |
| 2020/0073686 A1* | 3/2020 | Hanke | ..................... | G06F 18/22 |

\* cited by examiner

*Primary Examiner* — Michael Pham
(74) *Attorney, Agent, or Firm* — DLA PIPER LLP (US)

(57) ABSTRACT

A method and system that proactively generate alerts for updating a scraping script to avoid scraping script errors. A predetermined number of webpages targeted by the scraping script are randomly sampled. The scraping script is appended to each webpage in the sample. A structured list of text fragments across the webpages with the appended script is generated. At predetermined time intervals, a fresh set of webpages is sampled, the scraping script is appended to the webpages, and a new structured list is generated. If the new structured list and the previous structured list do not match, the webpages may have been changed and the scraping script may have to be updated. An alert is generated indicating that such update is required and may include a location of the mismatch. Therefore, scraping script errors are proactively detected and can be rectified before an actual error occurs and propagates.

20 Claims, 6 Drawing Sheets

300a

300b

June 24th, 2023                                                Froggy Bank

Hello Ada Lovelace

Here are your transactions: ⟵322
                         326      328
     | Date          | Description          | Amount | Balance |
324  | June 21, 2023 | The computer museum  | 15     | 109     |
     | June 22, 2023 | Nick's place – Palo Alto | 29 | 80      |

...

```
Document doc = Jsoup.parse(html);
Element transactions = doc.getElementsContainingOwnText("Here are your transactions:").first();  // 310
Element table = transactions.nextElementSibling();
Elements rows = table.select("tr");
List<Item> items = new ArrayList<>();

for (int i = 1; i < rows.size(); i++) {
    Element row = rows.get(i);
    Elements cols = row.select("td");
    String date = cols.get("Date").text();           // 312
    String description = cols.get("Description").text();  // 314
    double amount = Double.parseDouble(cols.get("Amount").text());  // 316
    Item closet = new Item(date, description, amount);
    items.add(item);
}

Gson gson = new Gson();
    String json = gson.toJson(items);
    System.out.println(json);
    }
}
```
320

GENERATING A PROACTIVE ALERT FOR OUTDATED SCRAPING SCRIPT

BACKGROUND

Automated and regular scraping of information from webpages is a widely used operation in computing networks. For example, a scraping script may execute on an enterprise server to read information from webpages rendered by other servers, and the information may be collected for other downstream operations (e.g., for data analysis). The volume and scale of the scraping is generally massive: for example, an enterprise server may, often on a daily basis, run thousands of scraping scripts to scrape information from tens of thousands of webpages.

The scraping scripts are generally computer programs (e.g., written in Java®) developed specifically for different webpages. To ensure the accuracy of the process, the scraping scripts are generally "tightly-coupled" to the target webpages. That is, the scraping scripts are developed based on the structure of the target webpages so that the corresponding information is faithfully scraped.

This optimization towards accuracy, however, has a significant drawback because the webpages are constantly being changed. For instance, a scraping script, developed for a current version of a webpage, becomes quickly outdated when the webpage is updated to a new version. The errors caused by the scraping script being outdated cannot be identified until runtime when an actual error occurs. Worse still, some errors may remain undetected until they cascade to other downstream operations.

A current solution is to manually patch the scraping scripts in response to detecting errors, such that the patching conforms the scraping script to a new webpage. But this solution is far from satisfactory. Particularly, the solution is reactive—the patching is done after an error is detected, and after some disruption has already occurred. Furthermore, the timing of the error detection is far from certain—the error may not be detected until late in the process, requiring significant resources to fix the error and its consequences.

As such, a significant improvement to updating scraping scripts that scrape information from webpages is desired.

SUMMARY

Embodiments disclosed herein solve the aforementioned technical problems and may provide other technical solutions as well. One or more embodiments disclosed herein proactively generate alerts for updating a scraping script to avoid scraping script errors. A predetermined number of webpages targeted by the scraping script are randomly sampled. The scraping script is appended to each webpage in the sample. A structured list of text fragments across the webpages with the appended script is generated and maintained. At predetermined time intervals (e.g., daily), a fresh set of webpages is sampled, the scraping script is appended to the webpages, and a new structured list is generated. If there is a mismatch between the new structured list and the previous structured list, the webpages may have changed and the scraping script may have to be updated. Accordingly, an alert is generated to indicate that an update may be required; the alert may include an indication of a location of the mismatch. Therefore, scraping script errors are proactively detected and can be rectified before an actual error occurs and propagates.

In an embodiment, a method is provided. The method may include generating a sample comprising a predetermined number of webpages targeted by a scraping script and appending the scraping script to each of the webpages in the sample. The method may further include identifying common text fragments across the webpages appended with the scraping script and generating a structured list of text fragments based on the identified common text fragments. The method may also include outputting an alert that the scraping script needs an update responsive to determining that the structured list of text fragments does not match an existing list of text fragments.

In another embodiment, a system is provided. The system may include a non-transitory storage medium storing computer program instructions and a processor configured to execute the computer program instructions to perform operations. The operations may include generating a sample comprising a predetermined number of webpages targeted by a scraping script and appending the scraping script to each of the webpages in the sample. The operations may further include identifying common text fragments across the webpages appended with the scraping script and generating a structured list of text fragments based on the identified common text fragments. The operations may also include outputting an alert that the scraping script needs an update responsive to determining that the structured list of text fragments does not match an existing list of text fragments.

BRIEF DESCRIPTION OF THE DRAWINGS

FIGS. 3C-3D show example documents generated by appending a scraping script to the webpages based on the principles disclosed herein.

DETAILED DESCRIPTION OF SEVERAL EMBODIMENTS

One or more embodiments disclosed herein may proactively detect scraping script errors and generate corresponding alerts. The proactive detection and error generation is based on periodically generating a random sample of target webpages for a scraping script, appending the scraping script to the webpages, and generating a structured list of common text fragments across the webpages appended with the scraping script. The structured list represents common textual features across the webpages and the scraping script. As long as the structured list holds for each new sample, there is no update to the webpages and the scraping script need not be updated. When the structured list does not hold, however, the webpages may have been changed and may require an update to the scraping script. Therefore, an alert is generated if there is a mismatch between a new structured list and an existing structured list, where the alert may show the location of the mismatch. This location may indicate to a developer where the update is needed. The aforementioned sampling, structured list generation, and comparison may be done periodically (e.g., daily, hourly) to detect the scraping script errors before they occur and propagate.

Figure 1:
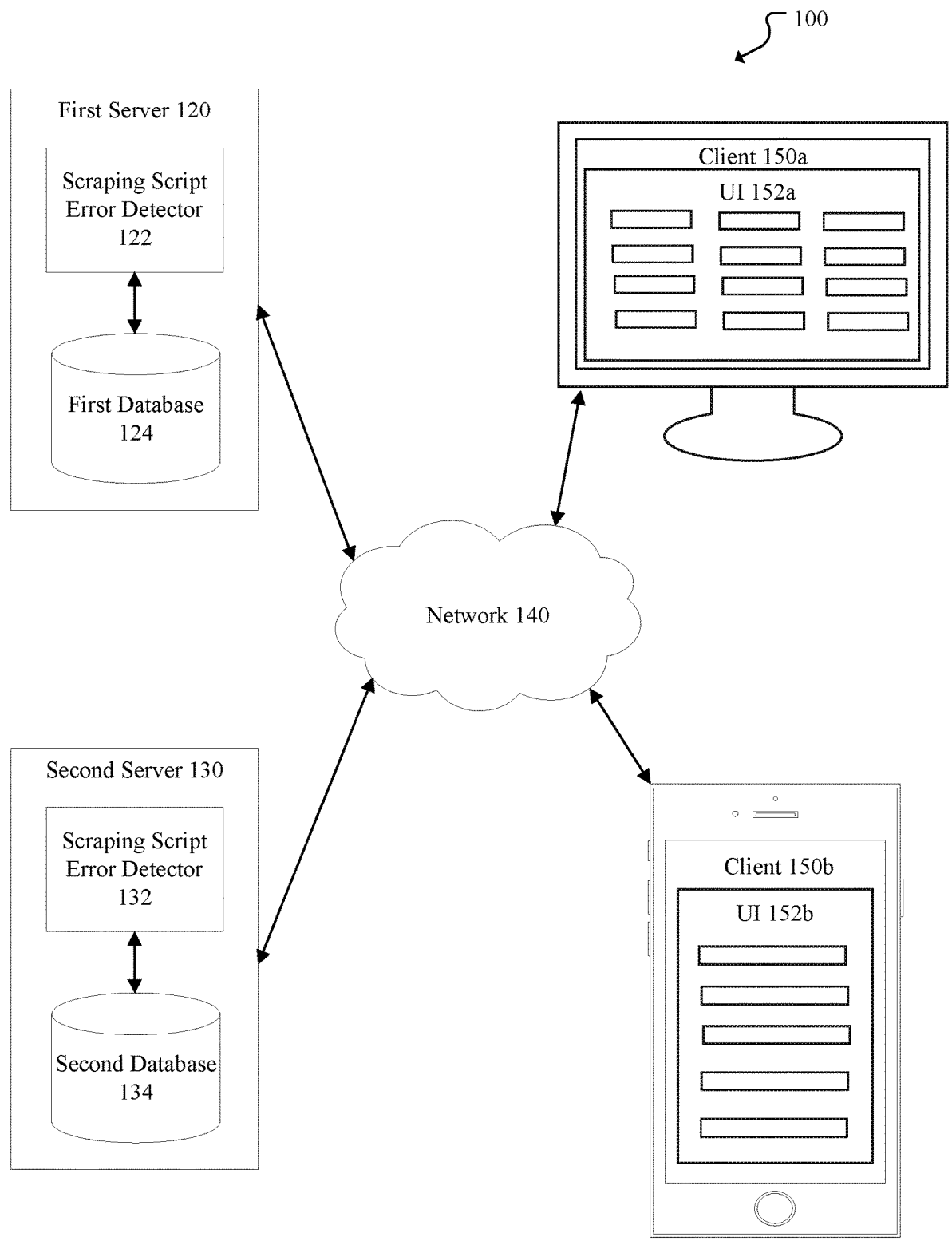
FIG. 1 shows an example of a system configured for detecting scraping script errors based on the principles disclosed herein.

FIG. 1 shows an example of a system 100 configured for detecting scraping script errors based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150") and servers 120, 130 interconnected through a network 140. The first server 120 hosts a first scraping script error detector 122 and a first database 124 and the second server 130 hosts a second scraping script error detector 132 and a second database 134. The client devices 150a, 150b have user interfaces 152a, 152b, respectively, (collectively referred to herein as "user interfaces (UIs) 152") that may be used to communicate with the scraping error detectors 122, 132 via the network 140. For example, communication between the different components of the system 100 is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs. The client devices 150 may generally be used by administrative and specialized users to receive alerts when scraping script errors are detected. In one or more embodiments, users interact with the scraping script error detectors 122, 132 through the UIs 152. The interactions may include, for example, configuring the scraping script error detectors 122, 132, updating corresponding scraping scripts after errors have been detected, managing frequency of receiving the alerts, etc.

Each of the scraping script error detectors 122, 132 performs the different processes described throughout this disclosure. For example, the scraping script error detectors 122, 132 periodically sample a number of webpages for a particular scraping script. The scraping script error detectors 122, 132 append the scraping script to each webpage in the sample and identify common text fragments across the webpages appended with the scraping script. The scraping script error detectors 122, 132 generate a structured list of the common text features. The scraping script error detectors 122, 132 also collect a fresh sample and generate a new structured list from the fresh sample. If the structured lists match, there is no scraping script error. If there is a mismatch, however, the webpages may have been updated and the scraping script may have to be updated. The scraping script detectors 122, 132 may indicate the necessity of the update—and/or a location for the update—through the UIs 152. The scraping script error detectors 122, 132 use the first database 124 and/or the second database 134 during the execution of these steps, e.g., to store the structured lists, to store the collected sample of webpages, etc.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

Figure 2:
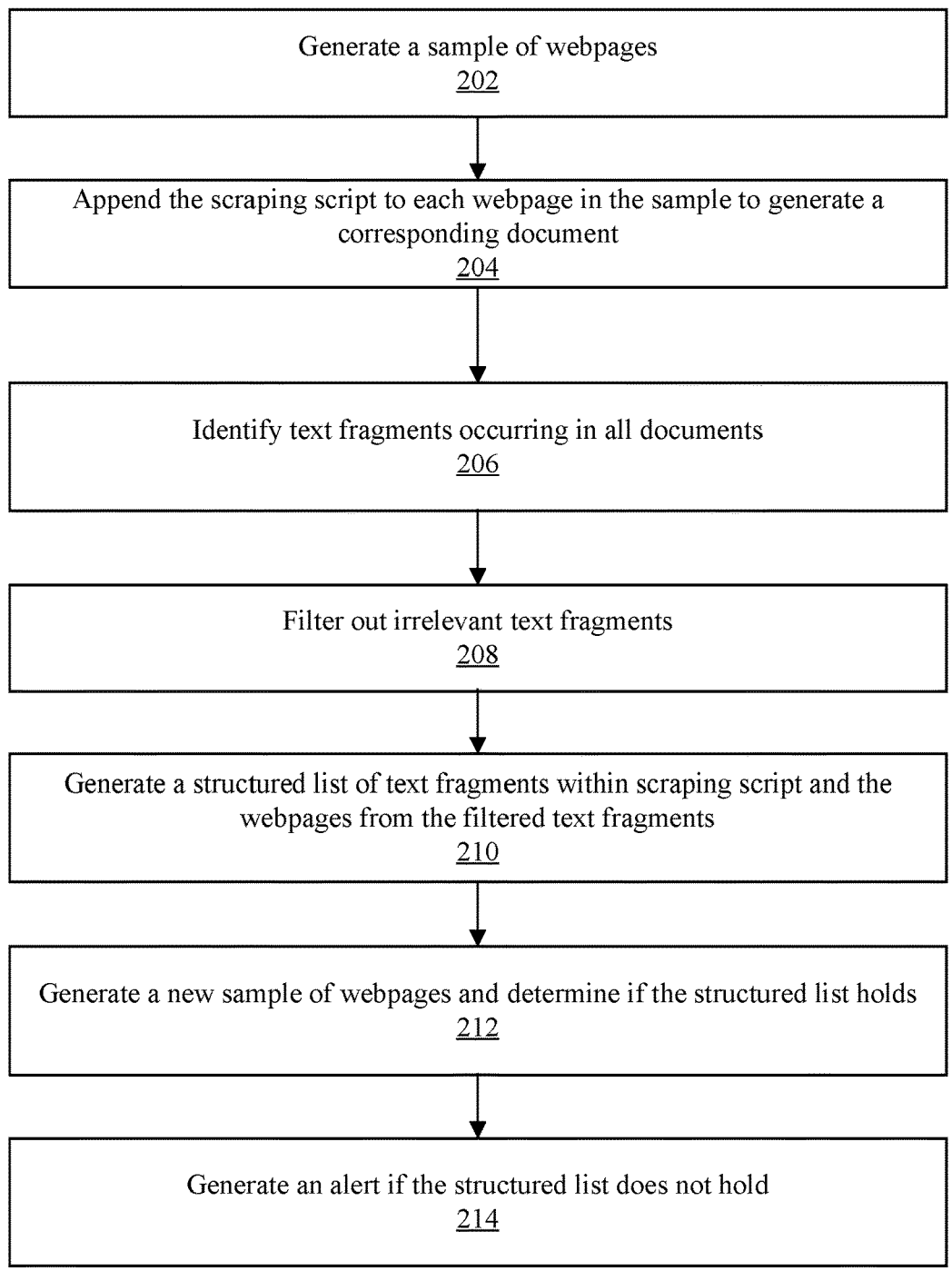
FIG. 2 shows a flow diagram of an example method of detecting scraping script errors based on the principles disclosed herein.

FIG. 2 shows a flow diagram of an example method 200 of detecting scraping script errors based on the principles disclosed herein. It should be understood that the steps of the method 200 are merely intended as examples and should not be considered limiting. Furthermore, the illustrated sequence of steps is used for explanatory purposes, and should not be considered limiting. That is, methods with additional, alternate, of fewer number of steps should also be considered within the scope of this disclosure. One or more steps of the method 200 may be performed by one or more components of the system 100 shown in FIG. 1.

The method 200 begins at step 202, where a sample of webpages is generated. The sample may include a subset of target webpages for a particular scraping script. For instance, a scraping script may scrape information for a webpage of a financial institution used by a large number of users; that is, each user may access an instance of the webpage populated with user-specific data. The sample may include a predetermined number of the instances of the webpage. For example, ten random instances of the webpage may be collected to generate the sample of webpages. For example, FIGS. 3A-3B discussed below show two random sample of webpages.

In one or more embodiments, each webpage in the sample may be rendered and only the rendered text may be selected for further processing. In other words, items that cannot be rendered, e.g., tags, labels, etc., are not used for further processing in these embodiments. If the rendering is not possible, the webpage is used without the rendering. For example, HTML text of the webpage may be used.

At step 204, the scraping script is appended to each webpage in the sample to generate a corresponding document. For example, a Java® code forming the scraping script may be appended to the webpages to generate the documents. Continuing with the above example of ten (instances of) the webpages, this step will generate ten documents, each having the same appended scraping script. To generate the corresponding document, the scraping script may be appended at any location within each webpage, for example, at the end of the webpage. For example, FIGS. 3C-3D discussed below show two example documents with an scraping script appended to the webpages.

At step 206, text fragments occurring in all documents are identified. The text fragments may be from the webpage and/or the appended scraping script. In one or more embodiments, each text fragment may require a length of more than a predetermined value (e.g., 5 characters). This avoids picking up text fragments that do not have significant meaning, e.g., program code such as "for," "do," "while"; variable names, tagging information, etc. Furthermore, it may also be a requirement that each text fragment is not contained within more lengthy text to avoid picking up text fragments that may not have significant meaning without the other text. That is, text fragments may be limited to those not within a longer set of text. This filtering may improve efficiency and reduce noise in the downstream operations.

In one or more embodiments, a suffix tree and/or suffix array data may be used on the documents to identify the text fragments. Suffix trees and suffix array data are known in the art and are therefore not described in detail in this disclosure. Generally, the suffix tree or suffix array data are used to generate structured representations of the text in the documents, and iterations through the structured representations allow the disclosed method to identify common text fragments across the documents. The structured representations further provide the imposition of constraints such as the size of the text fragment or the text fragment not being a part of a longer string when performing the identification step. It is, however, to be understood that the suffix tree and the suffix array data are just examples and that any other type of algorithm providing the identification functionality described herein should be considered within the scope of this disclosure.

At step 208, irrelevant text fragments are filtered out. The irrelevant text fragments may include, for example, HTML comments, Java® comments, and/or any other text that does not comprise the information to be scraped. In one or more embodiments, filtering out may be performed based on domain knowledge, e.g., knowledge of HTML and/or Java®. For example, a computer program may iterate through the identified text fragments and remove irrelevant text based on its programmed knowledge of HTML and/or Java®.

At step 210, a structured list of text fragments within the scraping script and webpages is generated from the filtered text fragments. The structured list may therefore indicate an association of the scraping script with the information on the webpages. In other words, the structured list may provide a current state of the match between the scraping script and the information on the target webpages. As further described below, should the structured list continue to hold for additional sampled webpages, it is determined that the information on the webpages has not changed and the scraping script need not be modified. Conversely, if the structured list does not hold, it is determined that the information has changed and the scraping script may have to be modified.

At step 212, a new sample of the webpages is generated and it is determined whether the structured list generated in step 210 holds. Step 212 may be executed at predetermined time intervals, e.g., daily, weekly, hourly, or on an as-needed basis. Step 212 may operate as a periodic check (e.g., after a predetermined time has elapsed since generating the existing structured list of text fragments and/or since a previous alert) to determine whether information on the webpages changed and to proactively determine whether the corresponding scraping script needs to be updated. The new sample of webpages may have the same number (or instances) of the webpages as used to generate the original list, but this is not a requirement. On the new sample of webpages, steps similar to steps 204, 206, 208, and 210 are performed to generate a new structured list of text fragments. The new structured list is then compared to the original structured list. If the lists match, the original structured list has held (i.e., remains suitable for use); and if the structured lists do not match, the original list has not held (i.e., no longer suitable for use).

At step 214, an alert may be generated responsive to determining that the structured list (i.e., the original structured list) has not held. The alert may be sent to a developer indicating that one or more webpages have been changed and the scraping script has to be modified. In one or more embodiments, the alert may identify one or more areas of mismatch between the lists. Such identification may allow a developer to determine where the scripting script may have to be updated. The alert may be sent to the developer through any kind of communication medium, including but not limited to, e-mail, text message, or any other type of electronic message. The alert may also be displayed on a user interface associated with the developer.

Figure 3A:
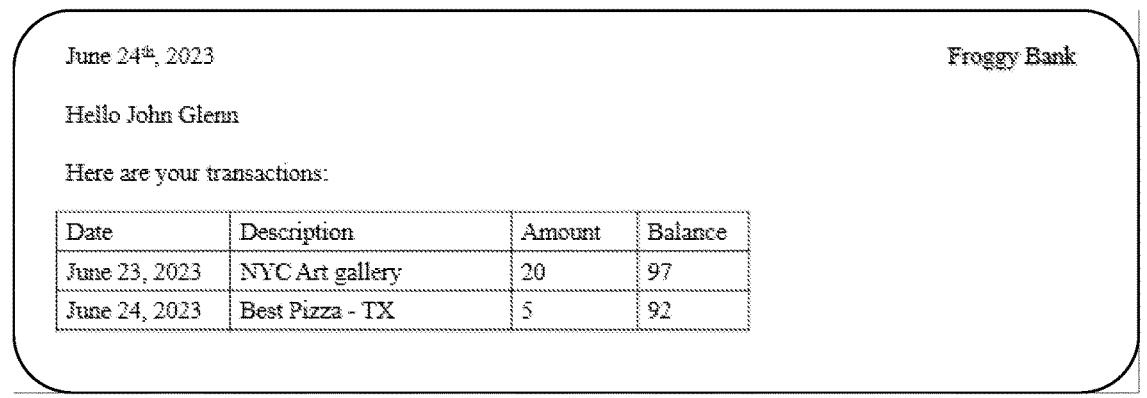
FIGS. 3A-3B show an example webpages targeted by scraping scripts based on the principles disclosed herein.
Figure 3B:
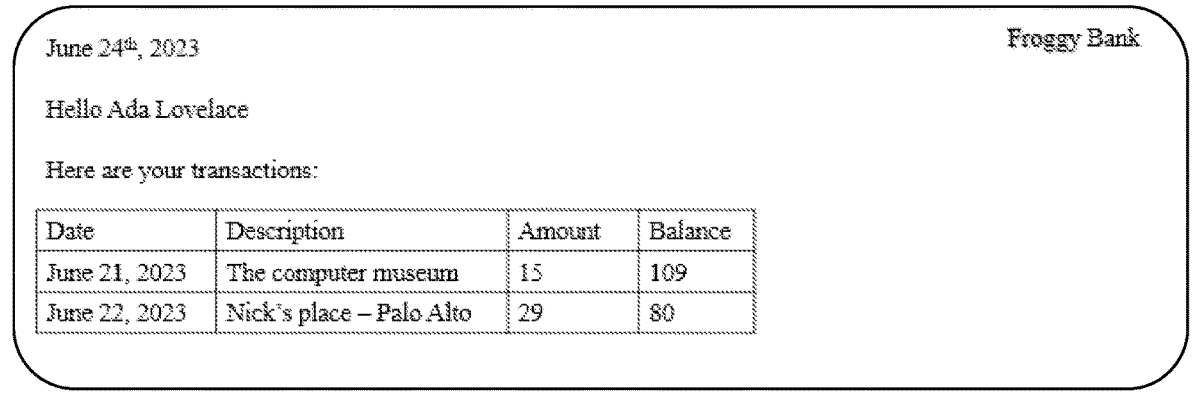

FIGS. 3A-3B show an example webpages 300a, 300b targeted by scraping scripts based on the principles disclosed herein. As shown, the example webpages 300a, 300b are of a same institution "Froggy Bank" but for different customers: webpage 300a is for customer "John Glenn" and webpage 300b is for customer "Ada Lovelace."

Figure 3C:
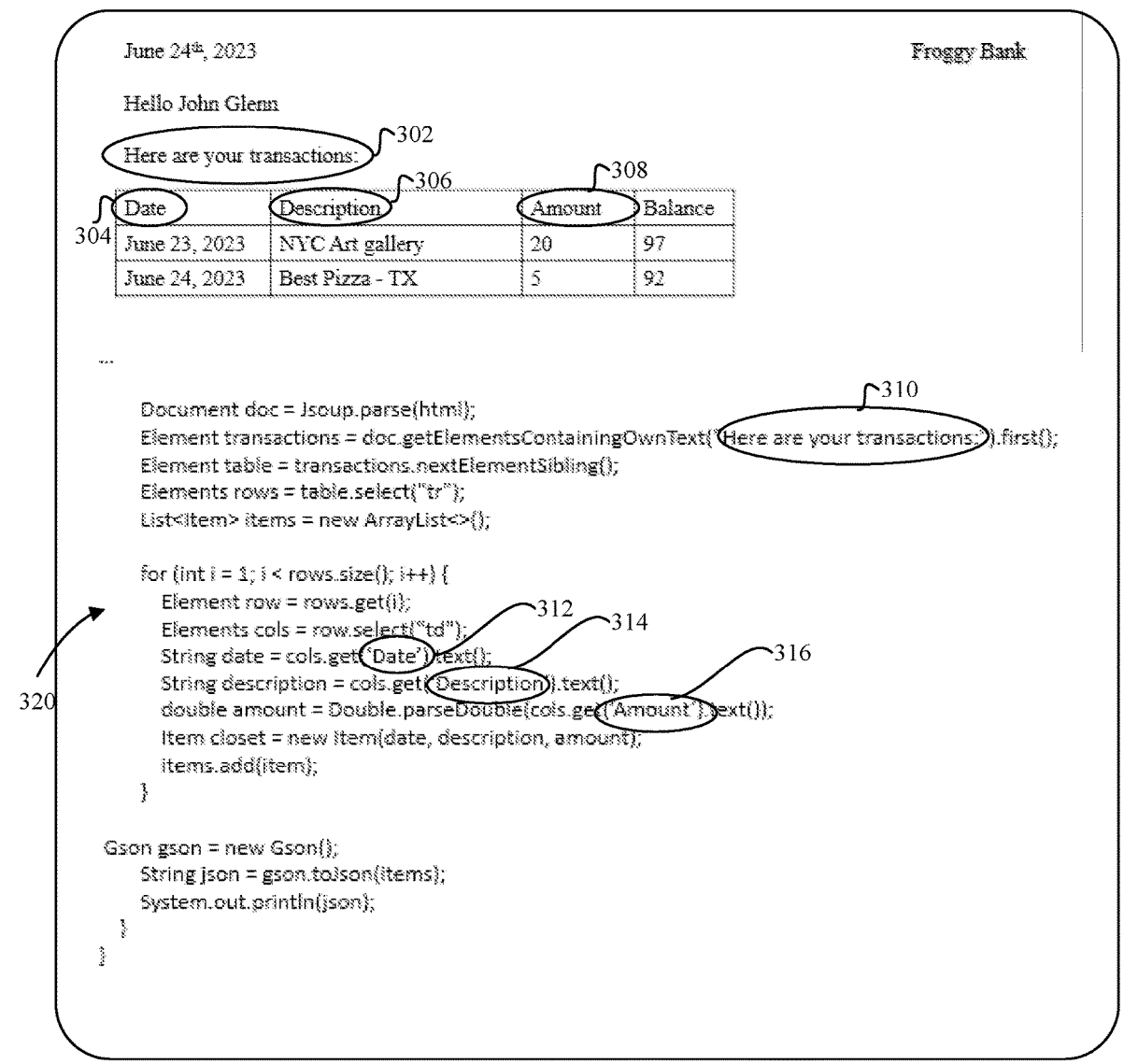

FIGS. 3C-3D show example documents 300c, 300d generated by appending a scraping script to the webpages, based on the principles disclosed herein. In FIG. 3C, a scraping script 320 is appended to the webpage 300a to generate the document 300c. In FIG. 3D, the scraping script 320 is appended to the webpage 300b to generate the document 300d. It should be understood that the scraping script 320 is just an example portion of a longer scraping script, and therefore should not be considered limiting.

As discussed with regards to the method 200, there are common text fragments between webpages 300a, 300b and the appended scraping script 320; and also between the documents 300c, 300d. As shown in the document 300c, the webpage 300a includes text fragments 302 ("Here are your transactions"), 304 ("Date"), 306 ("Description"), 308 ("Amount"). The appended scraping script 320 has counterpart text fragments, respectively, 310 ("Here are your transactions"), 312 ("Date"), 314 ("Description"), 316 ("Amount"). As similarly shown in the document 300d, the webpage 300b includes text fragments 322 ("Here are your transactions"), 324 ("Date"), 326 ("Description"), 328 ("Amount"). And the appended scraping script 320 has counterpart text fragments, respectively, 310 ("Here are your transactions"), 312 ("Date"), 314 ("Description"), 316 ("Amount"). Embodiments disclosed herein generate a structured list of the text fragments from the text fragments within the scraping script 320 to determine if any of the webpages have been changed to warrant a change in the scraping script 320.

Figure 4:
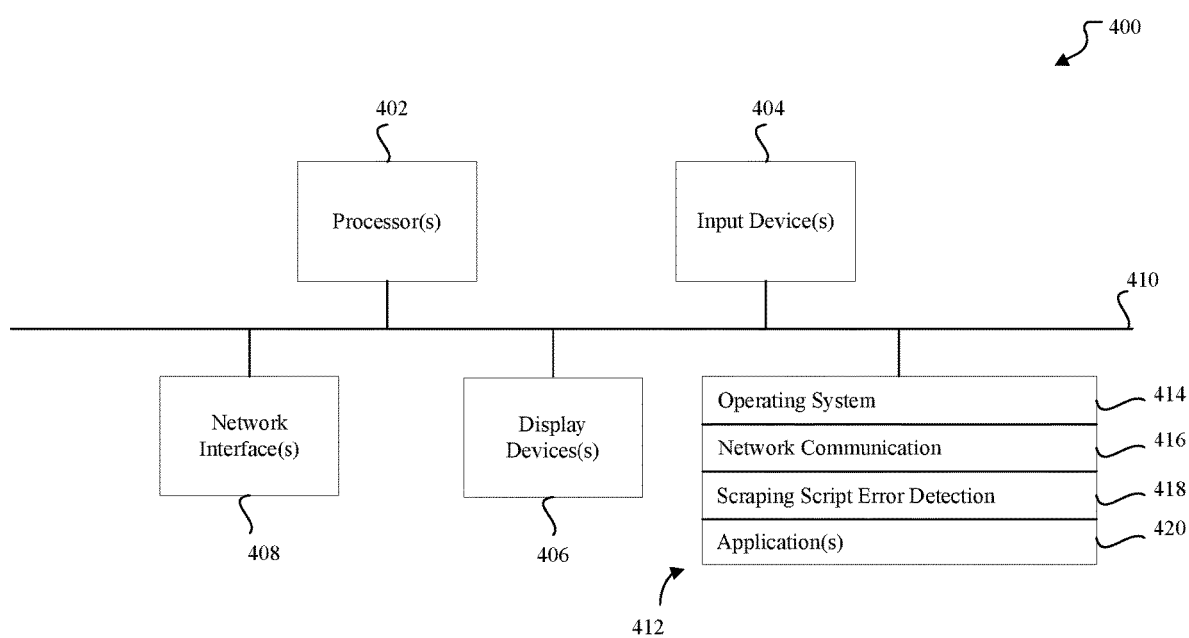
FIG. 4 shows a block diagram of an example computing device that implements various features and processes based on the principles disclosed herein.

FIG. 4 shows a block diagram of an example computing device 400 that implements various features and processes based on the principles disclosed herein. For example, computing device 400 may function as first server 120, second server 130, client 150a, client 150b, or a portion or combination thereof in some embodiments. The computing device 400 also performs one or more steps of the method 200. The computing device 400 is implemented on any electronic device that runs software applications derived from compiled instructions, including without limitation personal computers, servers, smart phones, media players, electronic tablets, game consoles, email devices, etc. In some implementations, the computing device 400 includes one or more processors 402, one or more input devices 404, one or more display devices 406, one or more network interfaces 408, and one or more computer-readable media 412. Each of these components is be coupled by a bus 410.

Display device 406 includes any display technology, including but not limited to display devices using Liquid Crystal Display (LCD) or Light Emitting Diode (LED) technology. Processor(s) 402 uses any processor technology, including but not limited to graphics processors and multi-core processors. Input device 404 includes any known input device technology, including but not limited to a keyboard (including a virtual keyboard), mouse, track ball, and touch-sensitive pad or display. Bus 410 includes any internal or external bus technology, including but not limited to ISA, EISA, PCI, PCI Express, USB, Serial ATA or FireWire. Computer-readable medium 412 includes any non-transitory computer readable medium that provides instructions to processor(s) 402 for execution, including without limitation, non-volatile storage media (e.g., optical disks, magnetic disks, flash drives, etc.), or volatile media (e.g., SDRAM, ROM, etc.).

Computer-readable medium 412 includes various instructions 414 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 404; sending output to display device 406; keeping track of files and directories on computer-readable medium 412; controlling peripheral devices (e.g., disk drives, printers, etc.) which can be controlled directly or through an I/O controller; and managing traffic on bus 410. Network communications instructions 416 establish and maintain network connections (e.g., software for implementing communication protocols, such as TCP/IP, HTTP, Ethernet, telephony, etc.).

Scraping script error detection 418 include instructions that implement the disclosed process for proactively detecting scripting errors and generating alerts thereto.

Application(s) 420 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, said method comprising:
   generating a sample comprising a predetermined number of webpages targeted by a scraping script;
   appending the scraping script to each of the webpages in the sample to generate corresponding predetermined number of documents comprising the webpages appended with the scraping script;
   identifying common text fragments across the documents;
   generating a structured list of text fragments based on the identified common text fragments; and
   outputting an alert that the scraping script needs an update responsive to determining that the structured list of text fragments does not match an existing list of text fragments.

2. The method of claim 1, the identifying the common text fragments comprising:
   identifying the common text fragments having more than a predetermined length.

3. The method of claim 1, the identifying the common text fragments comprising:
   identifying the common text fragments that are not within a longer set of text.

4. The method of claim 1, the identifying the common text fragments comprising:
   identifying the common text fragments using a suffix tree or suffix array data.

5. The method of claim 1, the generating the structured list of text fragments comprising:
   filtering out irrelevant common text fragments to generate a filtered set of common text fragments; and
   generating the structured list of text fragments from the filtered set of common text fragments.

6. The method of claim 5, the filtering out irrelevant common text fragments comprising:
   filtering out the irrelevant common text fragments based on a domain knowledge associated with the webpages.

7. The method of claim 1, the structured list being generated and the alert being generated after a predetermined time interval has elapsed since a previous alert.

8. The method of claim 1, the outputting the alert comprising:
   outputting the alert indicating a location in the scraping script that needs the update.

9. The method of claim 1, further comprising:
   rendering at least one of the webpages to select a corresponding rendered text for appending the scraping script.

10. The method of claim 1, the appending the scraping script comprising:
    appending the scraping script to a text portion of each of the webpages.

11. A system comprising:
    a non-transitory storage medium storing computer program instructions; and
    a processor configured to execute the computer program instructions to perform operations comprising:
      generating a sample comprising a predetermined number of webpages targeted by a scraping script;
      appending the scraping script to each of the webpages in the sample to generate corresponding predetermined number of documents comprising the webpages appended with the scraping script;
      identifying common text fragments across the documents;
      generating a structured list of text fragments based on the identified common text fragments; and
      outputting an alert that the scraping script needs an update responsive to determining that the structured list of text fragments does not match an existing list of text fragments.

12. The system of claim 11, the identifying the common text fragments comprising:
    identifying the common text fragments having more than a predetermined length.

13. The system of claim 11, the identifying the common text fragments comprising:
    identifying the common text fragments that are not within a longer set of text.

14. The system of claim 11, the identifying the common text fragments comprising:
    identifying the common text fragments using a suffix tree or suffix array data.

15. The system of claim 11, the generating the structured list of text fragments comprising:
    filtering out irrelevant common text fragments to generate a filtered set of common text fragments; and
    generating the structured list of text fragments from the filtered set of common text fragments.

16. The system of claim 15, the filtering out irrelevant common text fragments comprising:
    filtering out the irrelevant common text fragments based on a domain knowledge associated with the webpages.

17. The system of claim 11, the structured list being generated and the alert being generated after a predetermined time interval has elapsed since a previous alert.

18. The system of claim 11, the outputting the alert comprising:
    outputting the alert indicating a location in the scraping script that needs the update.

19. The system of claim 11, further comprising:
    rendering at least one of the webpages to select a corresponding rendered text for appending the scraping script.

20. The system of claim 11, the appending the scraping script comprising:
    appending the scraping script to a text portion of each of the webpages.

* * * * *